(12) United States Patent
Wu

(10) Patent No.: US 11,477,450 B2
(45) Date of Patent: Oct. 18, 2022

(54) INDICATION OF VIDEO SLICE HEIGHT IN VIDEO SUBPICTURES

(71) Applicant: ZTE (UK) Limited, Brentford (GB)

(72) Inventor: Ping Wu, Brentford (GB)

(73) Assignee: ZTE (UK) Limited, Brentford (GB)

( * ) Notice: Subject to any disclaimer, the term of this patent is extended or adjusted under 35 U.S.C. 154(b) by 37 days.

(21) Appl. No.: 16/723,506

(22) Filed: Dec. 20, 2019

(65) Prior Publication Data

US 2021/0195186 A1 Jun. 24, 2021

(51) Int. Cl.
| | |
|---|---|
| *H04N 19/119* | (2014.01) |
| *H04N 19/96* | (2014.01) |
| *H04N 19/167* | (2014.01) |
| *H04N 19/172* | (2014.01) |
| *H04N 19/184* | (2014.01) |
| *H04N 19/196* | (2014.01) |

(52) U.S. Cl.
CPC ......... *H04N 19/119* (2014.11); *H04N 19/167* (2014.11); *H04N 19/172* (2014.11); *H04N 19/184* (2014.11); *H04N 19/196* (2014.11); *H04N 19/96* (2014.11)

(58) Field of Classification Search
CPC .... H04N 19/119; H04N 19/167; H04N 19/96; H04N 19/66; H04N 19/172
See application file for complete search history.

(56) References Cited

U.S. PATENT DOCUMENTS

| | | | |
|---|---|---|---|
| 10,951,899 B2* | 3/2021 | Samuelsson | H04N 19/70 |
| 11,159,827 B2* | 10/2021 | Choi | H04N 19/172 |
| 2014/0003504 A1* | 1/2014 | Ugur | H04N 19/167 |
| | | | 375/240.12 |
| 2017/0134726 A1* | 5/2017 | Sim | H04N 19/11 |
| 2020/0260070 A1* | 8/2020 | Yoo | H04N 19/103 |
| 2021/0044798 A1* | 2/2021 | Kim | H04N 19/186 |
| 2021/0092451 A1* | 3/2021 | Choi | H04N 19/172 |
| 2021/0176475 A1* | 6/2021 | Hsu | H04N 19/176 |
| 2021/0195186 A1* | 6/2021 | Wu | H04N 19/119 |
| 2021/0195205 A1* | 6/2021 | Liu | H04N 19/105 |
| 2021/0329265 A1* | 10/2021 | Wang | H04N 19/66 |

(Continued)

OTHER PUBLICATIONS

Modifications for subpictures; Li; Oct. 2019. (Year: 2019).*

(Continued)

*Primary Examiner* — Luis Perez-Fuentes
(74) *Attorney, Agent, or Firm* — Perkins Coie LLP

(57) ABSTRACT

Methods, apparatus and systems for video bitstream generation and parsing are described. One example bitstream decoding method includes parsing a portion of a video bitstream at a video unit level for a first field indicative of whether a slice height is specified for a subpicture partitioning or for a tile partitioning at the video unit level, parsing, due to determining that the first field indicates that the slice height is specified for the subpicture partitioning, N second fields in the portion of the video bitstream to obtain heights for rectangular slices in the video unit, wherein the heights are indicated in multiple of coding tree unit (CTU) heights, and wherein each rectangular slice comprises one or more CTU rows that belong to a same subpicture, wherein N is a positive integer, and decoding, based on the first field and/or the N second fields, the video bitstream to generate a video.

20 Claims, 13 Drawing Sheets

(56) References Cited

U.S. PATENT DOCUMENTS

2022/0109855 A1* 4/2022 Wang .................. H04N 19/44

OTHER PUBLICATIONS

Versatile video coding VVC, Draft 6; Brass—Jul. 2019. (Year: 2019).*

Meeting Report of the 17th Meeting of the Joint Video Experts Team (JVET); Jan. 2020. (Year: 2020).*

International Search Report and Written Opinion for International Patent Application No. PCT/EP2020/086159, dated Apr. 9, 2021, 14 pages.

Ping Wu (ZTE): "AHG9: On indication of rectangular slice height in video subpictures", 17. JVET Meeting: Jan. 7, 2020-Jan. 17, 2020; Brussels; (The Joint Video Exploration Team of ISO/IEC JTC1/SC29/WG11 and ITU-TSG.16), No. JVET-Q0164; m51753 Dec. 28, 2019 (Dec. 28, 2019), XP030222748, Retrieved from the Internet: URL:http://phenix.int-evry.fr/jvet/doc end user/documents/17 Brussels/wgll/JVET-Q0016 4-vl.zip JVET-Q0164.docx [retrieved on Dec. 28, 2019] 12 pages.

Ouedraogo (Canon) N et al: "AHG12: On "tile-fraction" slices and signaling of slices per subpicture", A 17. JVET Meeting; Jan. 7, 2020-Jan. 17, 2020; Brussels; (The Joint Video Exploration Team of ISO/IEC JTC1/SC29/WG11 and ITU-TSG.16), n' o. JVET-Q0377 ; m51972 Jan. 7, 2020 (Jan. 7, 2020), XP030223365, Retrieved from the Internet: URL:http://phenix.int-evry.fr/jvet/doc end user/documents/17 Brussels/wgll/JVET-Q0377-v2.zip JVET-Q0377 rl.docx [retrieved on Jan. 7, 2020] 4 pages.

Li (Panasonic) J et al.: "AHG12: Modification for subpicture", 16. JVET Meeting; Oct. 1, 2019-Oct. 11, 2019 Geneva; (The Joint Video Exploration Team of ISO/IEC JTC1/SC29/WG11 and Itu-T SG.16 ) ' n' o. JVET-P0171 ; m50130 Sep. 28, 2019 (Sep. 28, 2019), XP030216490, Retrieved from the Internet: URL:http://phenix.int-evry.fr/jvet/doc end user/documents/16 Geneva/wgll/JVET-P0171-v2.zip JVET-P0171 v2/JVET-P0171-v2.docx [retrieved on Sep. 28, 2019] 6 pages.

* cited by examiner

INDICATION OF VIDEO SLICE HEIGHT IN VIDEO SUBPICTURES

TECHNICAL FIELD

This patent document is directed generally to video and image encoding and decoding.

BACKGROUND

In the last three decades, a number of different video coding standards have been published for representing digital video into a compressed format by removing some visual redundancy and information in the digital video. During this time, pixel resolution of encoded video content has steadily risen from the early days of Source Input Format (SIF) resolution in MPEG-1 video standard to 4K or 8K video being currently contemplated. Accordingly, newer video coding standards have adopted more efficient and flexible coding techniques to accommodate increased resolution of video.

SUMMARY

This patent document describes, among other things, techniques for encoding and decoding digital video using techniques that can be used for signaling height of a rectangular slice in a coding tree unit in a subpicture of a video.

In one example aspect, a method of bitstream processing is disclosed. The method includes parsing a portion of a video bitstream at a video unit level for a first field indicative of whether a slice height is specified for a subpicture partitioning or for a tile partitioning at the video unit level, parsing, due to determining that the first field indicates that the slice height is specified for the subpicture partitioning, N second fields in the portion of the video bitstream to obtain heights for rectangular slices in the video unit, wherein the heights are indicated in multiple of coding tree unit (CTU) heights, and wherein each rectangular slice comprises one or more CTU rows that belong to a same subpicture, wherein N is a positive integer, and decoding, based on the first field and/or the N second fields, the video bitstream to generate a video.

In another aspect, a video decoder apparatus comprising a processor configured to implement the above-implemented method is disclosed.

In yet another aspect, a method of encoding video is disclosed. The method includes including, in a video bitstream representing a video, a first field indicative of whether a slice height is specified for a subpicture partitioning or for a tile partitioning for encoding a video picture, inserting, due to including the first field indicates that the slice height is specified for the subpicture partitioning, N second fields in the video bitstream indicating heights for rectangular slices in the video picture, wherein the heights are indicated in multiple of coding tree unit (CTU) heights, and wherein each rectangular slice comprises one or more CTU rows that belong to a same subpicture, wherein N is a positive integer, and encoding, by including on the first field and/or the N second fields, the video picture of the video.

In yet another example aspect, a video processing apparatus comprising a processor is disclosed. The processor is configured to implement an encoding or a decoding method described herein.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Figure 1:
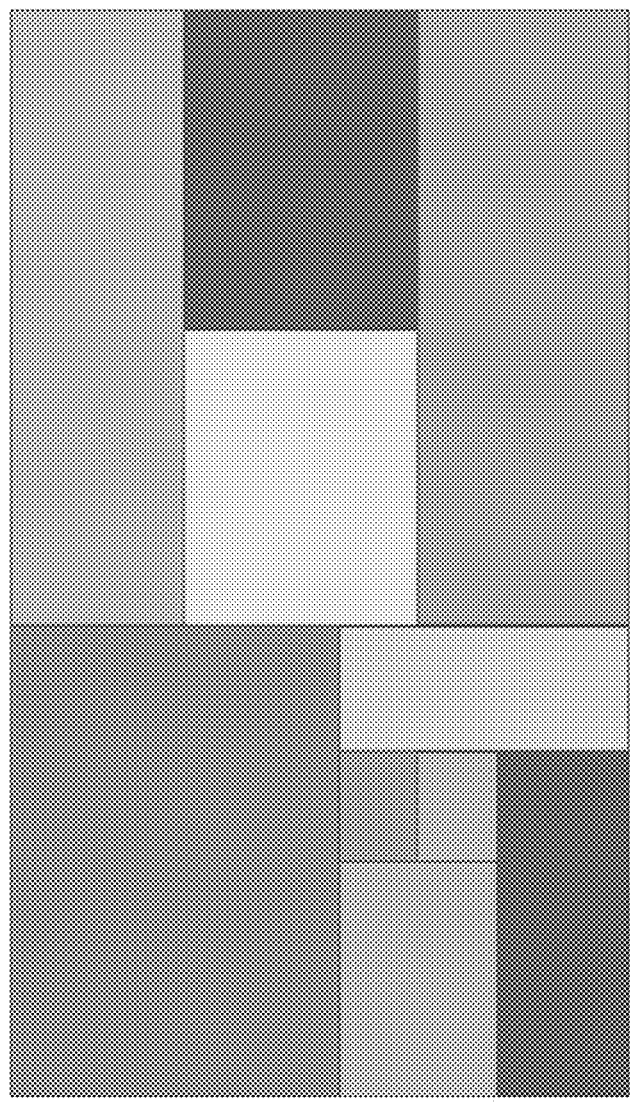
FIG. 1 shows an example of a video picture partitioned into 10 subpictures.

Section headings are used in the present document only to improve readability and do not limit scope of the disclosed embodiments and techniques in each section to only that section. Certain features are described using the example of the H.264/AVC (advanced video coding), H.265/HEVC (high efficiency video coding) and H.266 Versatile Video Coding (VVC) standards. However, applicability of the disclosed techniques is not limited to only H.264/AVC or H.265/HEVC or H.266/VVC systems.

This patent document relates to video processing and communication, in particular to methods and apparatus for encoding a digital video or picture to generate a bitstream, methods and apparatus for decoding a bitstream to reconstruct a digital video or picture, methods and apparatus for extracting a bitstream to form a sub-bitstream.

Brief Discussion

Techniques for compressing digital video and picture utilize correlation characteristics among pixel samples to remove redundancy in the video and picture. An encoder may partition a picture into one or more regions containing a number of units. Such region breaks prediction dependencies within a picture, so that a region can be decoded or at least syntax elements corresponding to this region can be correctly parsed without referencing to data of another region in the same picture. Such region introduced in video coding standards is to facilitate resynchronization after data losses, parallel processing, region of interesting coding and streaming, packetized transmission, view-port dependent streaming, and etc. For example, in H.264/AVC standard, example of such region can be slice and slice group. In H.265/HEVC standard, example of such region can be slice and tile.

In the development of next-generation video coding standard, MPEG (Moving Picture Experts Group) has mandated that the next-generation video codec should enable efficient extraction of a desired viewport from the compressed bitstream. In addition, in applications involving 4K, 8K and even higher resolution videos, a viewer may be allowed to select a view-port for rendering on terminal devices, and thus it is useful to enable an efficient extraction of a sub-bitstream from the bitstream corresponding to the original resolution.

Brief Introduction

In current JVET-P2001 (VVC Draft 7) specification, the video picture partitions are based on subpictures, tiles and slices. The subpictures and the tiles are typically indicated in the bitstream, although through very different methods. While subpictures structure has been given a rather flexible partition arrangement, the tiles structure is specified as a grid system.

In the current text of the standard, if rectangular slices are contained inside a tile, there is a designed way to specify the heights of the rectangular slices in coding tree unit (CTU) size measure. However, the technology provided in VVC presently provides no solution or mechanism to specify heights of rectangular slices that may be positioned to fall inside a subpicture partition. For instance, if the whole video picture is one tile and at the same time there are multiple subpictures in the video picture, there is currently no way to encode the relationship between CTU size and slice heights for slices inside a subpicture. Furthermore, a relationship between heights of such rectangular slices and corresponding CTU size will not be understood by a decoder based on the syntax elements in the bitstream that represents encoded video.

One possible way to indicate rectangular slices heights (in CTU size measure) inside a subpicture is to set the tile's size the same as a CTU size, which would typically result in small-sized tiles. Then, by counting number of such small sized tiles (which are now equivalent in height to CTU), slice height in CTU size measure can be represented using a bitstream format compliant with JVET-P2001 VVC Draft 7. However, this is a sub-optimal solution because it overly constrains the tile size and fails to truly use the benefit of VVC tiles structure design.

In some embodiments according to a solution, for a convenient indication of heights of the rectangular slices in CTU size measure, two new syntax elements and their semantics may be used. The first syntax element is called_ect_sice_height_in_subpic_only_flag and may use the format (u(1)). The second syntax structure is called slice_height_in_ctu_in_subpic_minus1[i++] and may use the format (ue(v)).

The syntax elements may be used as follows.

The first syntax element identifies the context or reference of how slice height is specified. For example, the first synrect_slice_height_in_subpic_only_flag equal to 1 specifies that slice height is specified with subpictures partition only. Furthermore, rect_slice_height_in_subpic_only_flag equal to 0 specifies that slices height is specified with tiles partition.

The second syntax element may be used to indicate slice heights in units of CTU rows. For example, slice_height_in_ctu_in_subpic_minus1[i] plus 1 specifies the height of the i-th rectangular slice in units of CTU rows for the case where the i-th slice contains a subset of CTU rows from a single subpicture. The value of slice_height_in_ctu_minus1[i] will be in the range of 0 to Ceil(pic_height_max_in_luma_samples/CtbSizeY)−1, inclusive.

An Example Embodiment

In current VVC Draft 7 specification, a picture partitions can be done as multiple tiles, slices or subpictures. There is a problem for rectangular slices indication: when only one tile for a complete video picture, it cannot indicate the slice height in CTUs within a subpicture. In this contribution, a solution is proposed to allow either slice height in CTUs inside a tile or inside a subpicture.

Handling Subpictures in VVC Draft 7

In current VVC Draft 7 specification, the structure of subpictures is indicated in Sequence Parameter Set (SPS) as:

TABLE 1

|  | Descriptor |
| --- | --- |
| seq_parameter_set_rbsp( ) { |  |
|   sps_decoding_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) |  |
|     profile_tier_level( 1, sps_max_sublayers_minus1 ) |  |
|   gdr_enabled_flag | u(1) |
|   sps_seq_parameter_set_id | u(4) |
|   chroma_format_idc | u(2) |
|   if( chroma_format_idc = = 3 ) |  |
|     separate_colour_plane_flag | u(1) |
|   ref_pic_resampling_enabled_flag | u(1) |
|   pic_width_max_in_luma_samples | ue(v) |
|   pic_height_max_in_luma_samples | ue(v) |
|   sps_log2_ctu_size_minus5 | u(2) |
|   *subpics_present_flag* | *u(1)* |
|   *if( subpics_present_flag ) {* |  |

TABLE 1-continued

| | Descriptor |
|---|---|
| *sps_num_subpics_minus1* | *u(8)* |
| *for( i = 0; i <= sps_num_subpics_minus1; i++ ) {* | |
|     *subpic_ctu_top_left_x[ i ]* | *u(v)* |
|     *subpic_ctu_top_left_y[ i ]* | *u(v)* |
|     *subpic_width_minus1[ i ]* | *u(v)* |
|     *subpic_height_minus1[ i ]* | *u(v)* |
|     *subpic_treated_as_pic_flag[ i ]* | *u(1)* |
|     *loop_filter_across_subpic_enabled_flag[ i ]* | *u(1)* |
| *}* | |
| *}* | |
| sps_subpic_id_present_flag | u(1) |
| if( sps_subpics_id_present_flag ) { | |
|     sps_subpic_id_signalling_present_flag | u(1) |
|     if( sps_subpics_id_signalling_present_flag ) { | |
|         sps_subpic_id_len_minus1 | ue(v) |
|         for( i = 0; i <= sps_num_subpics_minus1; i++ ) | |
|             sps_subpic_id[ i ] | u(v) |
|     } | |
| } | |
| ............................ | |
|     sps_extension_flag | u(1) |
|     if( sps_extension_flag ) | |
|         while( more_rbsp_data( ) ) | |
|             sps_extension_data_flag | u(1) |
|     rbsp_trailing_bits( ) | |
| } | |

The highlighted texts in italicized underline in above SPS marked the way that subpictures was defined: in general, all the partitions are based on CTU (Coding Tree Unit—basic unit), by specifying top left X, Y locations plus subpictures width and height information, subpictures can be defined efficiently.

Figure 2A:
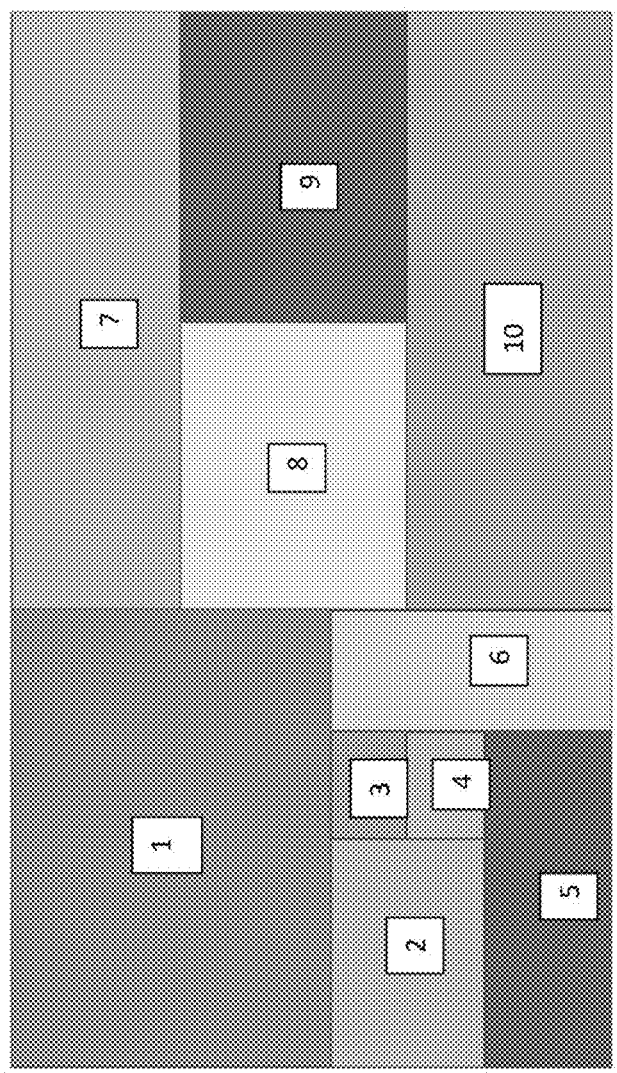
FIGS. 2A-2B show example processing orders when encoding or decoding a video picture comprising multiple subpictures.
Figure 2B:
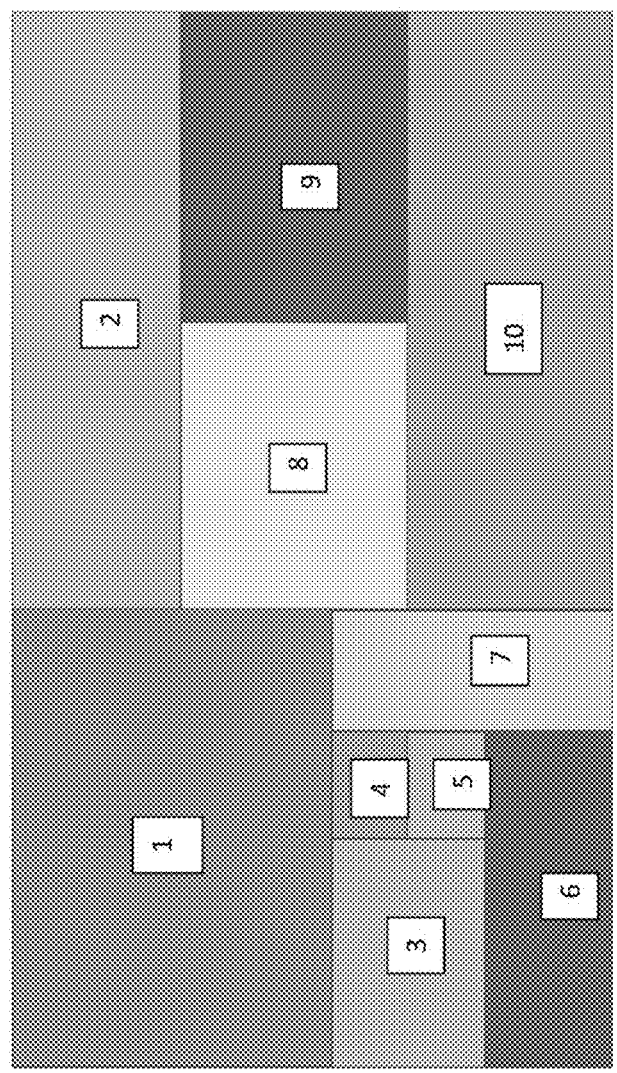

With current subpicture design, the partition of subpictures in FIG. 1 (each colored block is associated with a subpicture) can be supported. The processing order of all subpictures in FIG. 1 can be arranged differently (more than one possible way). The key constraint is that when a subpicture is encoded, this subpicture's entire left boundary and top boundary should be available. For instance: (1) the boundary pixels for the current subpicture are belonging to other subpictures that have already been processed (decoded), or (2) the relevant boundaries for the current subpicture are picture boundaries. The possible two processing orders for these ten subpictures are given in FIGS. 2A-2B Handling Tiles and Slices in VVC Draft 7

Figure 3A:
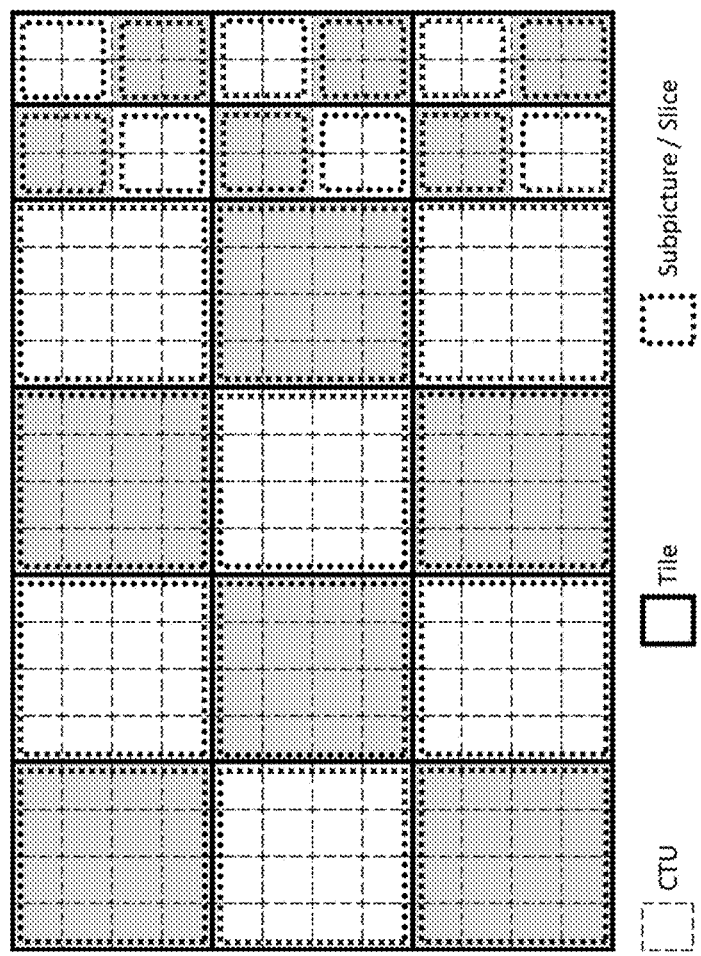
FIG. 3A shows an example of a video picture portioned into coding tree units (CTUs), tiles, slices and subpictures.
Figure 3B:
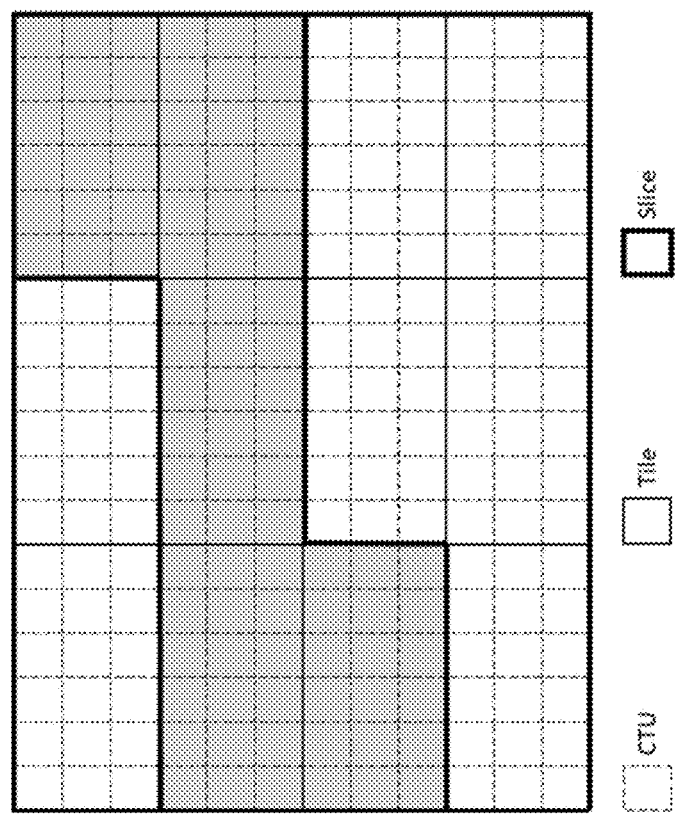
FIG. 3B shows a picture with 18 by 12 luma CTUs that is partitioned into 12 tiles and 3 raster-scan slices.

FIG. 3A shows an example of partitioning a picture into tiles, subpictures and slices. FIG. 3B is another example of a picture with 18 by 12 luma CTUs that is partitioned into 12 tiles and 3 raster-scan tiles.

Figure 4:
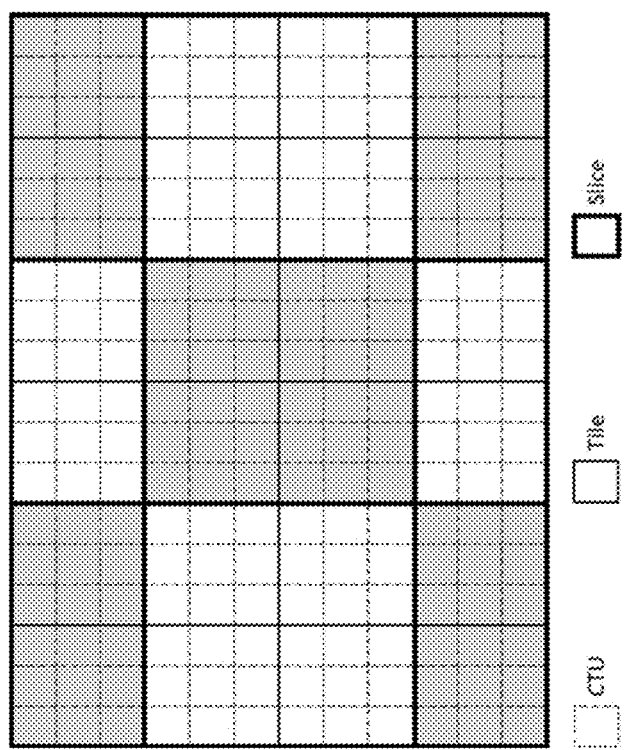
FIG. 4 shows a picture with 18 by 12 luma CTUs that is partitioned into 24 tiles and 9 rectangular slices.

FIG. 4 shows an example of 18 by 12 luma CTUs partitioned into 24 tiles and 9 rectangular slices.

Figure 5:
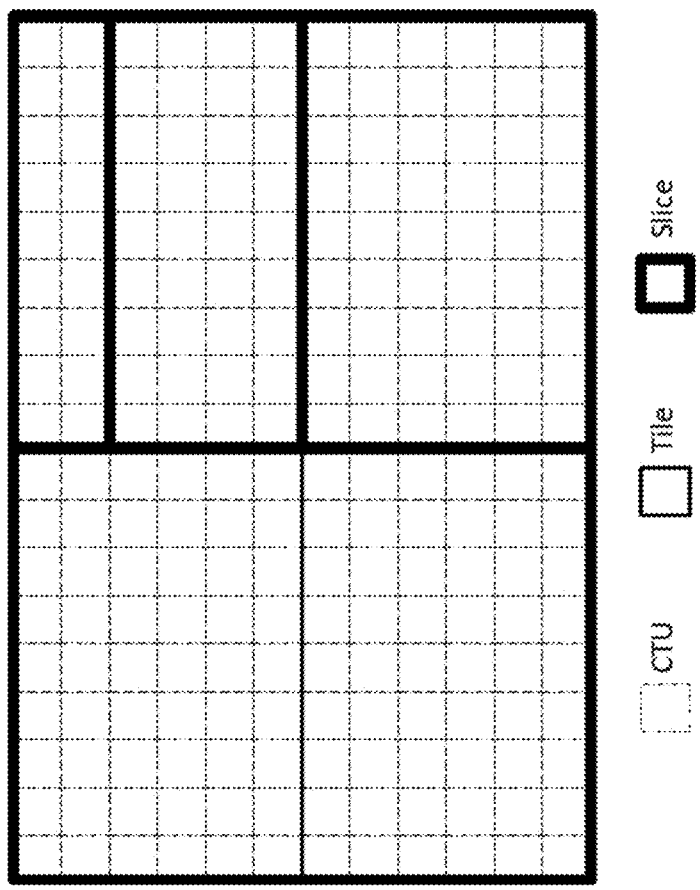
FIG. 5 shows a picture that is partitioned into 4 tiles and 4 rectangular slices.

FIG. 5 shows an example of a picture that is partitioned into 4 tiles and 4 rectangular slices.

In all these figures, it is clear that the tiles structure in VVC cannot flexibly support the video picture partition as showed in FIG. 1.

The tiles structure was described in PPS (Picture Parameter Set) as the following (relevant texts highlighted in "blue" color):

TABLE 2

| | Descriptor |
|---|---|
| pic_parameter_set_rbsp( ) { | |
|     pps_pic_parameter_set_id | ue(v) |
|     pps_seq_parameter_set_id | u(4) |
|     pic_width_in_luma_samples | ue(v) |
|     pic_height_in_luma_samples | ue(v) |
|     conformance_window_flag | u(1) |
| ............................ | |
|     pps_subpic_id_signalling_present_flag | u(1) |
|     if( pps_subpics_id_signalling_present_flag ) { | |
|         pps_num_subpics_minus1 | ue(v) |
|         pps_subpic_id_len_minus1 | ue(v) |
|         for( i = 0; i <= pps_num_subpic_minus1; i++ ) | |
|             pps_subpic_id[ i ] | u(v) |
|     } | |
|     no_pic_partition_flag | u(1) |
|     if( !no_pic_partition_flag ) { | |
|         pps_log2_ctu_size_minus5 | u(2) |
|         num_exp_tile_columns_minus1 | ue(v) |
|         num_exp_tile_rows_minus1 | ue(v) |
|         for( i = 0; i <= num_exp_tile_columns_minus1; i++ ) | |
|             tile_column_width_minus1[ i ] | ue(v) |

TABLE 2-continued

| | Descriptor |
|---|---|
| for( i = 0; i <= num_exp_tile_rows_minus1; i++ ) | |
|     tile_row_height_minus1[ i ] | ue(v) |
| rect_slice_flag | u(1) |
| if( rect_slice_flag ) | |
|     single_slice_per_subpic_flag | u(1) |
| if( rect_slice_flag && !single_slice_per_subpic_flag ) { | |
|     num_slices_in_pic_minus1 | ue(v) |
|     tile_idx_delta_present_flag | u(1) |
|     for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|                 slice_height_in_tiles_minus1[ i ] = = 0 ) { | |
|             num_slices_in_tile_minus1[ i ] | ue(v) |
|             numSlicesInTileMinus1 = num_slices_in_tile_minus1[ i ] | |
|             for( j = 0; j < numSlicesInTileMinus1; j++ ) | |
|                 slice_height_in_ctu_minus1[ i++ ] | ue(v) |
|         } | |
|         if( tile_idx_delta_present_flag && i < num_slices_in_pic_minus1 ) | |
|             tile_idx_delta[ i ] | se(v) |
|     } | |
| } | |
|     loop_filter_across_tiles_enabled_flag | u(1) |
|     loop_filter_across_slices_enabled_flag | u(1) |
| } | |
| ......................................................... | |
| pps_extension_flag | u(1) |
| if( pps_extension_flag ) | |
|     while( more_rbsp_data( ) ) | |
|         pps_extension_data_flag | u(1) |
| rbsp_trailing_bits( ) | |
| } | |

The highlighted texts in "blue" color showed that the tiles structure can be seen as a specific grid type.

Figure 6:
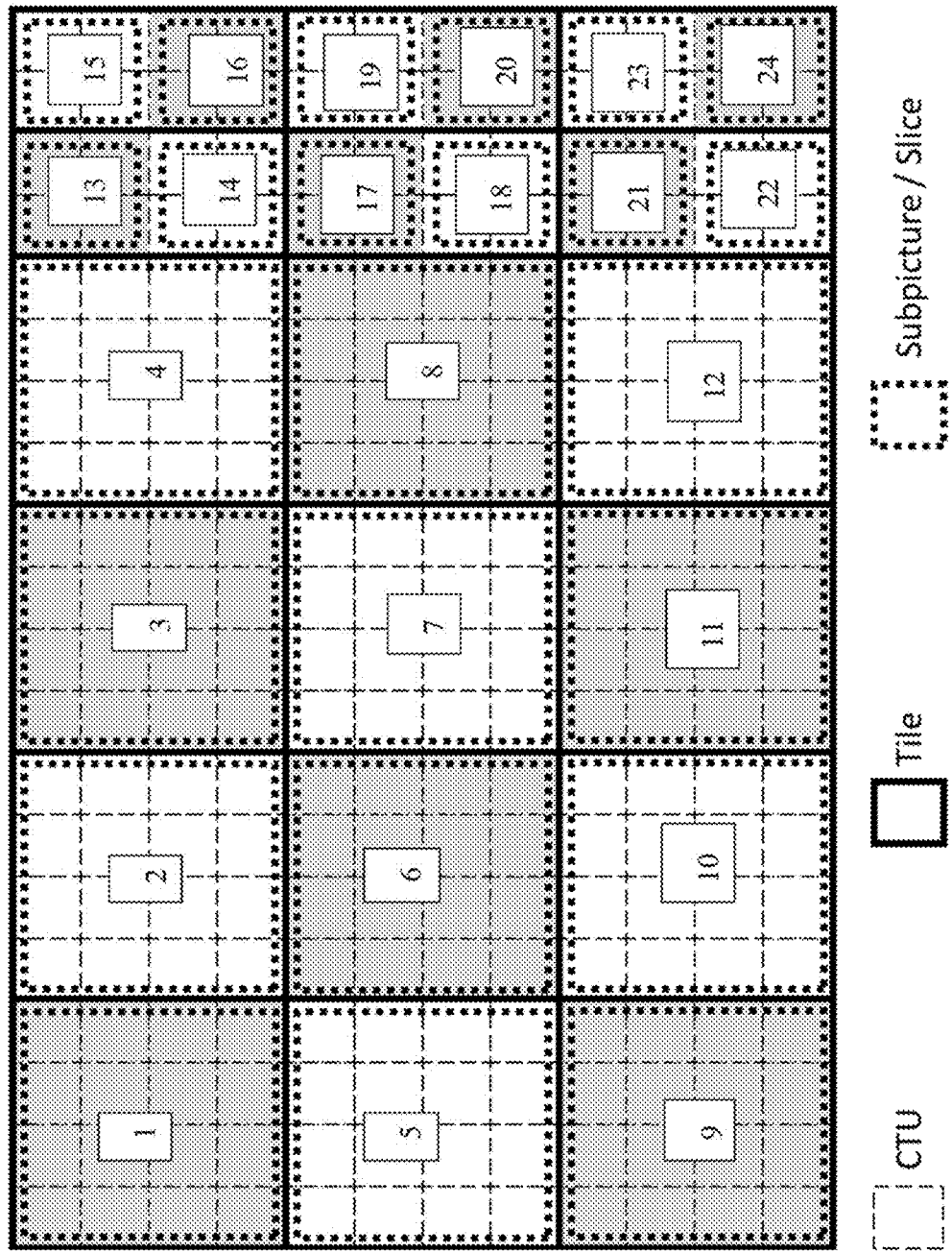
FIG. 6 shows an example video picture in which there are 18 tiles, 24 subpictures and 24 slices (20×12=240 CTUs).

FIG. 6 shows an example of a video picture with 18 tiles, 24 subpictures, and 24 slices with 20×12=240 CTUs.

Figure 7:
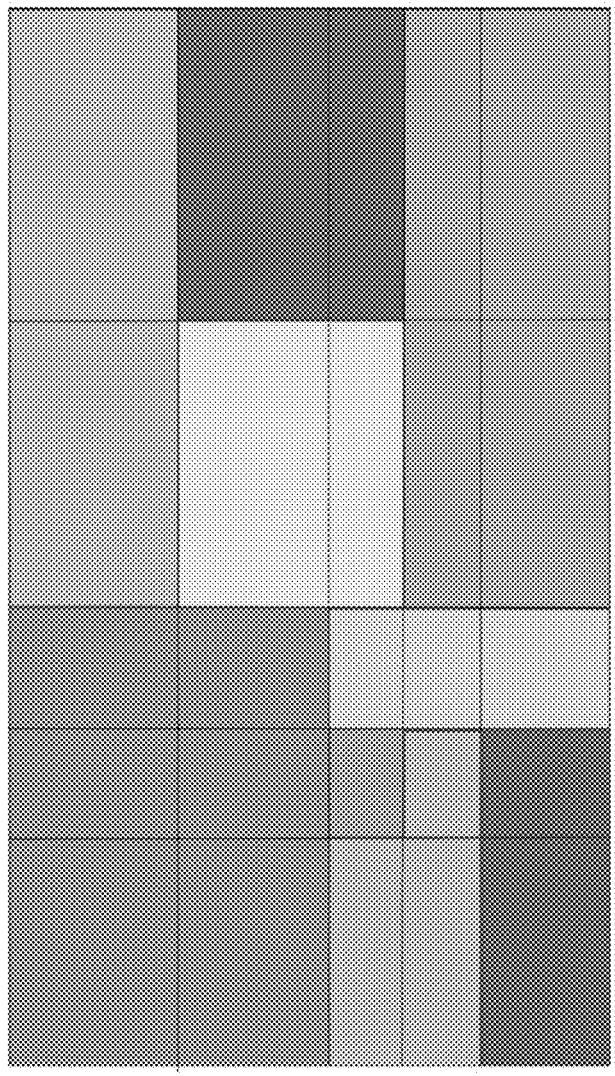
FIG. 7 shows an example video picture in which the partition are arranged as 5×5=25 tiles, but the tiles coding order will be restricted and the coding order through each CTU in scanning order is not entirely flexible in current VVC version.

To use tiles concepts in a partition arrangement and at the same time support FIG. 1 illustrated subpictures structure arrangement. In following FIG. 7, it show a possibility: the picture will need to be partitioned as 5×5=25 tiles as displayed. In FIG. 7, each colored box is still a subpicture partitioned in this video picture.

Supporting Multiple Rectangular Slices within Subpictures in JVET-P2001

According to current spec, the only way to support multiple slices is to use PPS part. In FIG. 1's example, we initially define 10 subpictures structure (top left X and Y location, plus subpicture width and height information). And then we define the whole picture has one single tile. Let us see a typical use case, for FIG. 1 illustrated subpictures partition, we would like to have two slices inside each subpicture, therefore, in total we should have 20 slices (for 10 subpictures).

In the table below, the new syntax elements that could be added to the current syntax structure of picture parameter set raw byte sequence payload (RBSP) is shown in italicized text.

TABLE 3

| | Descriptor |
|---|---|
| pic_parameter_set_rbsp( ) { | |
|     pps_pic_parameter_set_id | ue(v) |
|     pps_seq_parameter_set_id | u(4) |
|     pic_width_in_luma_samples | ue(v) |
|     pic_height_in_luma_samples | ue(v) |
|     conformance_window_flag | u(1) |
| ............................................. | |
|     pps_subpic_id_signalling_present_flag | u(1) |
|     if( pps_subpics_id_signalling_present_flag ) { | |
|         pps_num_subpics_minus1 | ue(v) |
|         pps_subpic_id_len_minus1 | ue(v) |
|         for( i = 0; i <= pps_num_subpic_minus1; i++ ) | |
|             pps_subpic_id[ i ] | u(v) |
|     } | |
|     no_pic_partition_flag | u(1) |
|     if( !no_pic_partition_flag ) { | |
|         pps_log2_ctu_size_minus5 | u(2) |
|         num_exp_tile_columns_minus1 | ue(v) |
|         num_exp_tile_rows_minus1 | ue(v) |

TABLE 3-continued

| | Descriptor |
|---|---|
| for( i = 0; i <= num_exp_tile_columns_minus1; i++ ) | |
|     tile_column_width_minus1[ i ] | ue(v) |
| for( i = 0; i <= num_exp_tile_rows_minus1; i++ ) | |
|     tile_row_height_minus1[ i ] | ue(v) |
| rect_slice_flag | u(1) |
| if( rect_slice_flag ) | |
|     single_slice_per_subpic_flag | u(1) |
| if( rect_slice_flag && !single_slice_per_subpic_flag ) { | |
|     num_slices_in_pic_minus1 | ue(v) |
|     rect_slice_height_in_subpic_only_flag | u(1) |
|     *if (rect_slice_height_in_subpic_only_flag) {* | |
|         *for( i = 0; i < num_slices_in_pic_minus1; i++ )* | |
|             *slice_height_in_ctu_in_subpic_minus1* [ i++ ] | ue(v) |
|     *} else {* | |
|         tile_idx_delta_present_flag | u(1) |
|         for( i = 0; i < num_slices_in_pic_minus1; i++ ) { | |
|             slice_width_in_tiles_minus1[ i ] | ue(v) |
|             slice_height_in_tiles_minus1[ i ] | ue(v) |
|             if( slice_width_in_tiles_minus1[ i ] = = 0 && | |
|                 slice_height_in_tiles_minus1[ i ] = = 0 ) { | |
|                 num_slices_in_tile_minus1[ i ] | ue(v) |
|                 numSlicesInTileMinus1 = num_slices_in_tile_minus1[ i ] | |
|                 for( j = 0; j < numSlicesInTileMinus1; j++ ) | |
|                       slice_height_in_ctu_minus1[ i++ ] | ue(v) |
|             } | |
|             if( tile_idx_delta_present_flag && i < num_slices_in_pic_minus1 ) | |
|                 tile_idx_delta[ i ] | se(v) |
|         } | |
|     } | |
| } | |
|     loop_filter_across_tiles_enabled_flag | u(1) |
|     loop_filter_across_slices_enabled_flag | u(1) |
| } | |
| ............................................. | |
|     pps_extension_flag | u(1) |
| if( pps_extension_flag ) | |
|     while( more_rbsp_data( ) ) | |
|         pps_extension_data_flag | u(1) |
| rbsp_trailing_bits( ) | |
| } | |

Another Example Changes in JVET-P2001 Specification

Under 6.5.1 "CTB raster scanning, tile scanning, and subpicture scanning processes" in the current document of the JVET specification, the existing texts may be clarified as follows.

The list CtbToSubPicIdx[ctbAddrRs] for ctbAddrRs ranging from 0 to PicSizeInCtbsY−1, inclusive, specifying the conversion from a CTB address in picture raster scan to a subpicture index, is derived as follows: (italicized text is to be deleted from the proposed amendment):

```
for( ctbAddrRs = 0; ctbAddrRs < PicSizeInCtbsY; ctbAddrRs++ ) {
    posX = ctbAddrRs % PicWidthInCtbsY * CtbSizeY
    posY = ctbAddrRs / PicWidthInCtbsY * CtbSizeY
    CtbToSubPicIdx[ ctbAddrRs ] = −1
    for( i = 0; CtbToSubPicIdx[ ctbAddrRs ] < 0 && i <= sps_num_subpics_minus1;
i++ ) {                                                                        (31)
        if( ( posX >= subpic_ctu_top_left_x[ i ] * CtbSizeY ) &&
              ( posX < ( subpic_ctu_top_left_x[ i ] + subpic_width_minus1[ i ] + 1 ) *
CtbSizeY ) &&
              ( posY >= subpic_ctu_top_left_y[ i ] * CtbSizeY ) &&
              ( posY < ( subpic_ctu_top_left_y[ i ] + subpic_height_minus1[ i ] + 1 ) *
CtbSizeY ) )
            CtbToSubPicIdx[ ctbAddrRs ] = i
    }
}
```

The list NumSlicesInSubpic[i] and SliceSubpicToPicIdx[i][k], specifying the number of rectangular slices in the i-th subpicture and picture-level slice index of the k-th slice in the i-th subpicture, are derived is derived as follows:

```
for( j = 0; j <= sps_num_subpics_minus1; j++ )
    NumSlicesInSubpic[ j ] = 0
for( i = 0; i <= num_slices_in_pic_minus1; i++ ) {
    posX = CtbAddrInSlice[ i ][ 0 ] % PicWidthInCtbsY * CtbSizeY
    posY = CtbAddrInSlice[ i ][ 0 ] / PicWidthInCtbsY * CtbSizeY
    for( j = 0; j <= sps_num_subpics_minus1; j++ ) {
        if( ( posX >= subpic_ctu_top_left_x[ j ] * CtbSizeY ) &&                    (32)
              ( posX < ( subpic_ctu_top_left_x[ j ] + subpic_width_minus1[ j ] + 1 ) * CtbSizeY ) &&
              ( posY >= subpic_ctu_top_left_y[ j ] * CtbSizeY ) &&
              ( posY < ( subpic_ctu_top_left_y[ j ] + subpic_height_minus1[ j ] + 1 ) * CtbSizeY-) ) {
            SliceSubpicToPicIdx[ j ][ NumSlicesInSubpic[ j ] ] = i
            NumSlicesInSubpic[ j ]++
        }
    }
}
```

The "italicized" emphasized texts are modified according to "JVET VVC Trac" information #742.

Furthermore, the following text may be added under 7.4.3.4 "Picture parameter set RBSP semantics":

rect_slice_height_in_subpic_only_flag equal to 1 specifies that slices height is specified with subpictures partition only. rect_slice_height_in_subpic_only_flag equal to 0 specifies that slices height is specified with tiles partition.

slice_height_in_ctu_in_subpic_minus1[i] plus 1 specifies the height of the i-th rectangular slice in units of CTU rows for the case where the i-th slice contains a subset of CTU rows from a single subpicture. The value of slice_height_in_ctu_minus1[i] shall be in the range of 0 to Ceil(pic_height_max_in_luma_samples/CtbSizeY)−1, inclusive.

Examples of Encoder, Decoder and System Implementations

Figure 8:
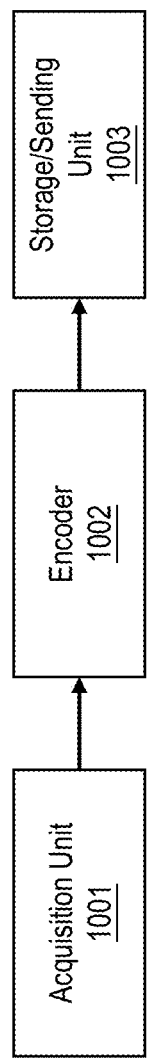
FIG. 8 shows a block diagram of an example video encoder.

FIG. 8 is a diagram illustrating a first example device containing at least the example video encoder or picture encoder.

Acquisition unit 1001 captures video and picture. Acquisition unit 1001 may be equipped with one or more cameras for shooting a video or a picture of nature scene. Optionally, acquisition unit 1001 may be implemented with a camera to get depth video or depth picture. Optionally, acquisition unit 1001 may include a component of an infrared camera. Optionally, acquisition unit 1001 may be configured with a remote sensing camera. Acquisition unit 1001 may also be an apparatus or a device of generating a video or a picture by scanning an object using radiation.

Optionally, acquisition unit 1001 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 1001 may also receive a video or picture from another device or processing unit. For example, acquisition unit 1001 can be a component unit in a transcoder. The transcoder feeds one or more decoded (or partial decoded) pictures to acquisition unit 1001. Another example is that acquisition unit 1001 get a video or picture from another device via a data link to that device.

Note that acquisition unit 1001 may be used to capture other media information besides video and picture, for example, audio signal. Acquisition unit 1001 may also receive artificial information, for example, character, text, computer-generated video or picture, and etc.

Encoder 1002 is an implementation of the example encoder. Input of encoder 1002 is the video or picture outputted by acquisition unit 1001. Encoder 1002 encodes the video or picture and outputs generated a video or picture bitstream.

Storage/Sending unit 1003 receives the video or picture bitstream from encoder 1002, and performs system layer processing on the bitstream. For example, storage/sending unit 1003 encapsulates the bitstream according to transport standard and media file format, for example, e.g. MPEG-2 TS, ISOBMFF, DASH, MMT, and etc. Storage/Sending unit 1003 stores the transport stream or media file obtained after encapsulation in memory or disk of the first example device, or sends the transport stream or media file via wireline or wireless networks.

Note that besides the video or picture bitstream from encoder 1002, input of storage/sending unit 1003 may also include audio, text, image, graphic, and etc. Storage/sending unit 1003 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Figure 9:
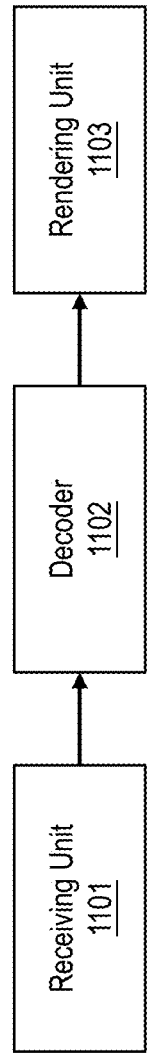
FIG. 9 shows a block diagram of an example video decoder.

FIG. 9 is a diagram illustrating a second example device containing at least the example video decoder or picture decoder.

Receiving unit 1101 receives video or picture bitstream by obtaining bitstream from wireline or wireless network, by reading memory or disk in an electronic device, or by fetching data from other device via a data link.

Input of receiving unit 1101 may also include transport stream or media file containing video or picture bitstream. Receiving unit 1101 extracts video or picture bitstream from transport stream or media file according to specification of transport or media file format.

Receiving unit 1101 outputs and passes video or picture bitstream to decoder 1102. Note that besides video or picture bitstream, output of receiving unit 1101 may also include audio bitstream, character, text, image, graphic and etc.

Receiving unit 1101 passes the output to corresponding processing units in the second example device. For example, receiving unit 1101 passes the output audio bitstream to audio decoder in this device.

Decoder 1102 is an implementation of the example decoder. Input of encoder 1102 is the video or picture bitstream outputted by receiving unit 1101. Decoder 1102 decodes the video or picture bitstream and outputs decoded video or picture.

Rendering unit 1103 receives the decoded video or picture from decoder 1102. Rendering unit 1103 presents the decoded video or picture to viewer. Rendering unit 1103 may be a component of the second example device, for example, a screen. Rendering unit 1103 may also be a separate device from the second example device with a data link to the second example device, for example, projector, monitor, TV set, and etc. Optionally, rendering 1103 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 1103 can be other media data from one or more units of the second example device, for example, audio, character, text, image, graphic, and etc. Input of rendering unit 1103 may also include artificial data, for example, lines and marks drawn by a local teacher on slides for attracting attention in remote education application. Rendering unit 1103 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Figure 10:
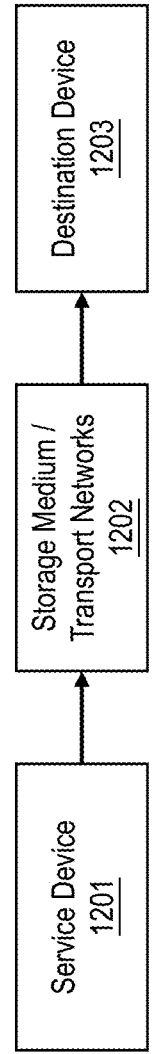
FIG. 10 shows an example of a video system.

FIG. 10 is a diagram illustrating an electronic system containing the first example device in FIG. 9 and the second example device in FIG. 4.

Service device 1201 is the first example device in FIG. 8.

Storage medium/transport networks 1202 may include internal memory resource of a device or electronic system, external memory resource that is accessible via a data link, data transmission network consisting of wireline and/or wireless networks. Storage medium/transport networks 1202 provides storage resource or data transmission network for storage/sending unit 1203 in service device 1201.

Destination device 1203 is the second example device in FIG. 5. Receiving unit 1201 in destination device 1203 receives a video or picture bitstream, a transport stream containing video or picture bitstream or a media file containing video or picture bitstream from storage medium/transport networks 1202.

The electronic system described in this embodiment can be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, and etc.

Figure 11:
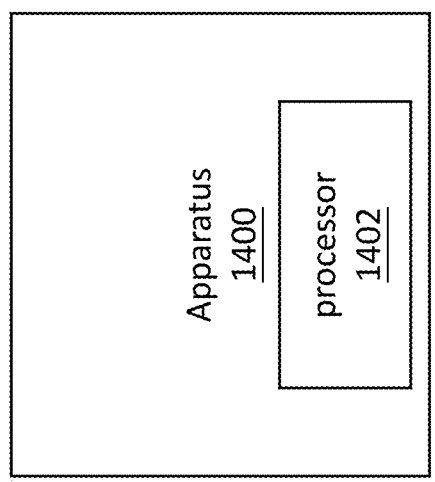
FIG. 11 shows an example of a video processing hardware platform.
Figure 12:
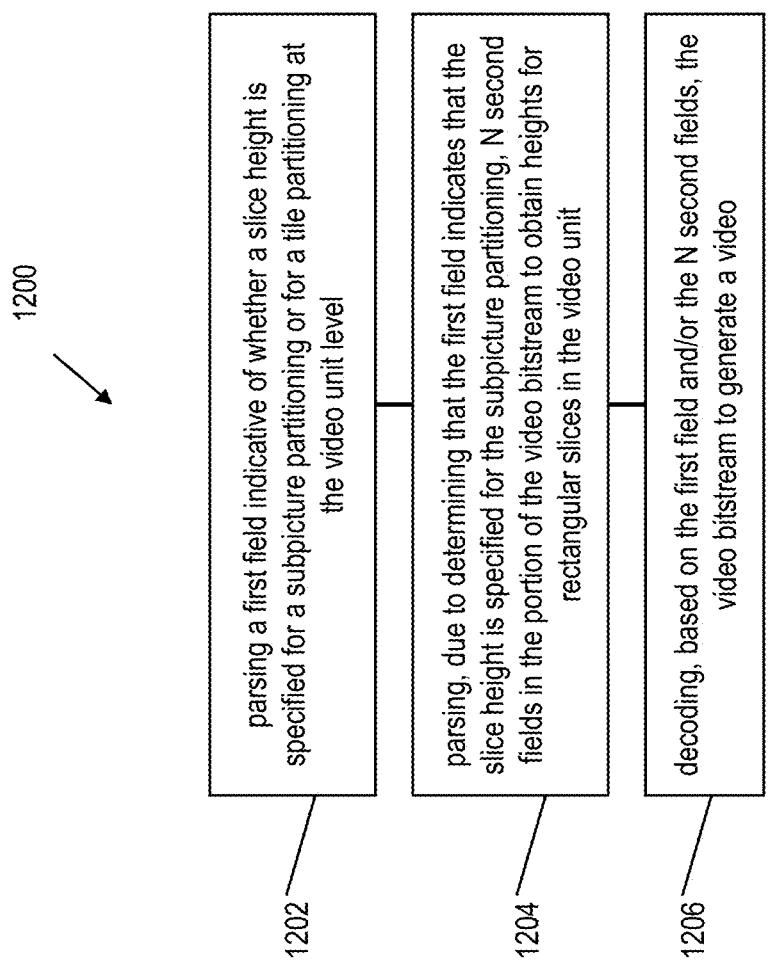
FIG. 12 is a flowchart for an example method of video processing.
Figure 13:
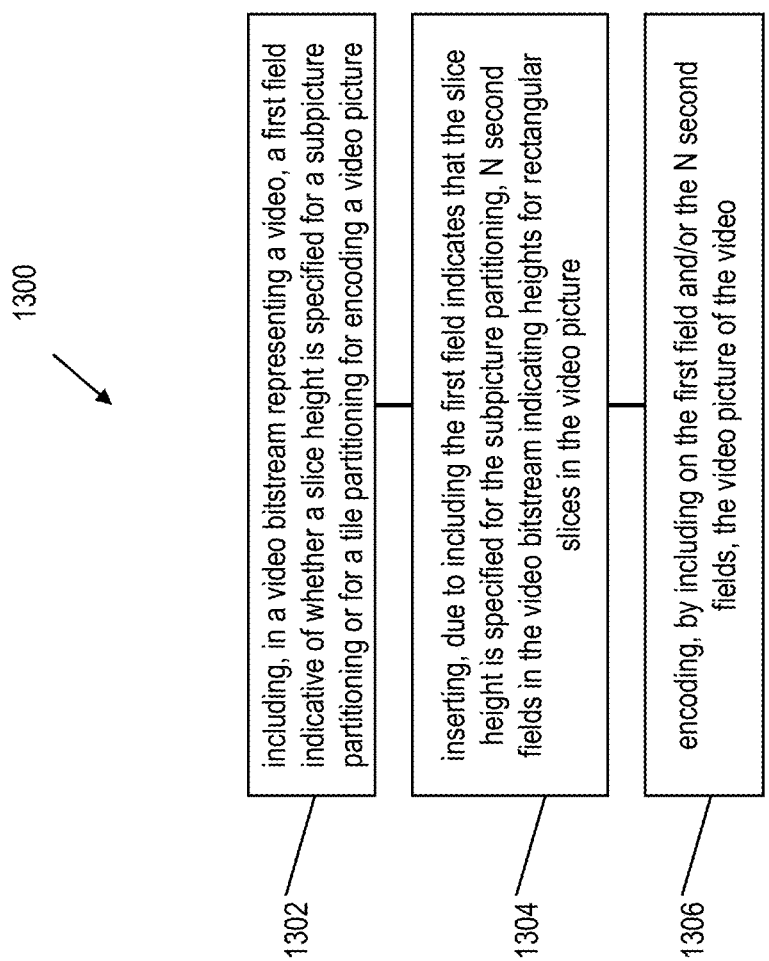
FIG. 13 is a flowchart for an example method of video processing.

FIG. 11 shows an example apparatus 1400 that may be used to implement encoder-side or decoder-side techniques described in the present document. The apparatus 1400 includes a processor 1402 that may be configured to perform the encoder-side or decoder-side techniques or both. The apparatus 1400 may also include a memory (not shown) for storing processor-executable instructions and for storing the video bitstream and/or display data. The apparatus 1400 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

The technical problems described in the present document with respect to video encoding and decoding technologies may be solved by some embodiments by preferably incorporating one or more of the following solutions.

1. A method of video bitstream processing, comprising: parsing a portion of a video bitstream at a video unit level for a first field indicative of whether a slice height is specified for a subpicture partitioning or for a tile partitioning at the video unit level; parsing, due to determining that the first field indicates that the slice height is specified for the subpicture partitioning, N second fields in the portion of the video bitstream to obtain heights for rectangular slices in the video unit, wherein the heights are indicated in multiple of coding tree unit (CTU) heights, and wherein each rectangular slice comprises one or more CTU rows that belong to a same subpicture, wherein N is a positive integer; and decoding, based on the first field and/or the N second fields, the video bitstream to generate a video.

2. The method of solution 1, wherein the video unit is a video picture.

3. The method of solution 1, wherein the first field is a one-bit field.

4. The method of solution 3, wherein the N second fields are positioned immediately following the first field in the video bitstream.

5. The method of solution 1, wherein the decoding the video bitstream comprises decoding multiple subpictures includes in the video unit.

6. The method of solution 1, wherein the N second fields are included in the video bitstream conditionally based on a value of the first field.

7. The method of solution 1, wherein the portion of the video bitstream is a parameter set.

8. The method of solution 7, wherein the parameter set is a picture parameter set.

9. A video decoder apparatus comprising a processor configured to perform operations including parsing a portion of a video bitstream at a video unit level for a first field indicative of whether a slice height is specified for a subpicture partitioning or for a tile partitioning at the video unit level; parsing, due to determining that the first field indicates that the slice height is specified for the subpicture partitioning, N second fields in the portion of the video bitstream to obtain heights for rectangular slices in the video unit, wherein the heights are indicated in multiple of coding tree unit (CTU) heights, and wherein each rectangular slice comprises one or more CTU rows that belong to a same subpicture, wherein N is a positive integer; and decoding, based on the first field and/or the N second fields, the video bitstream to generate a video.

10. The apparatus of solution 9, wherein the video unit is a video picture.

11. The apparatus of solution 9, wherein the first field is a one-bit field.

12. The apparatus of solution 11, wherein the N second fields are positioned immediately following the first field in the video bitstream.

13. The apparatus of solution 9, wherein the decoding the video bitstream comprises decoding multiple subpictures includes in the video unit.

14. The apparatus of solution 9, wherein the N second fields are included in the video bitstream conditionally based on a value of the first field.

15. The apparatus of solution 14, wherein the parameter set is a picture parameter set.

16. A method of video encoding, comprising: including, in a video bitstream representing a video, a first field indicative of whether a slice height is specified for a subpicture partitioning or for a tile partitioning for encoding a video picture; inserting, due to including the first field indicates that the slice height is specified for the subpicture partitioning, N second fields in the video bitstream indicating heights for rectangular slices in the video picture, wherein the heights are indicated in multiple of coding tree unit (CTU) heights, and wherein each rectangular slice comprises one or more CTU rows that belong to a same subpicture, wherein N is a positive integer; and encoding, by including on the first field and/or the N second fields, the video picture of the video.

17. The method of solution 16, wherein the first field is a one-bit field.

18. The method of solution 17, wherein the N second fields are included in the video bitstream immediately following the first field.

19. The method of solution 16, wherein the first field and the second field are includes in a picture parameter set. In some embodiments, computer program product may include a computer readable medium that includes processor-executable code for implementing a method described herein and in the claims.

20. A method of video decoding, comprising: determining, based on a first field in a video bitstream indicative of whether a slice height is specified for a subpicture partitioning or for a tile partitioning at the video unit level, whether a second field indicative of one or more slice heights is present in the video bitstream, and parsing the bitstream based on the determining to reconstruct the video from the video bitstream. For example, in case that the first field that the slice height is specified for subpicture partitioning, then determining that the second field is present and parsing the second field to recover slice heights. In one example, the second field occurs immediately after the first field and the second field may comprise N fields that each include an indication of one of N slices.

Alternatively, if the first field value indicates that the slice height is specified for tile partitions, then the video bitstream is further parsed with the understanding that the second field is not present in the video bitstream, e.g., by skipping any attempt to decode the second field.

21. A method of video encoding in which a value of a first field in a video bitstream indicative of whether a slice height is specified for a subpicture partitioning or for a tile partitioning at the video unit level, is used to determining whether a second field indicative of one or more slice heights is to be included in the video bitstream, and generating the bitstream based on the determining to encode the video from the video bitstream. For example, in case that the first field that the slice height is specified for subpicture partitioning, then including the second field. In one example, the second field occurs immediately after the first field and the second field may comprise N fields that each include an indication of one of N slices. Alternatively, if the first field is specified for slice partitioning, then omitting inclusion of the second field in the video bitstream.

The above methods may be implemented by an apparatus as shown in FIGS. 8 to 11.

6. INDUSTRIAL APPLICABILITY

From the above description, it can be known that techniques that enable signaling of slice heights in subpictures are disclosed. In one advantageous aspect, these techniques may be used by encoders to signal slice height separately and independently for subpictures and tiles, thereby allowing flexible organization of video pictures using subpictures.

It will further be appreciated that, with current VVC Draft 7, if an encoder sets each tile as small as each CTU; then for a subpicture, for coding regions inside it, the slice heights can be specified by the number of tile row heights (in this case: equal to the number of CTU heights). When doing it this way, the tile concept will be no further use as a good partition tool. With VVC Draft 7, if an encoder does not set such a small sized tile, then the encoder does not have the ability to specify the heights (with the number of CTU heights) of the slices inside the subpicture. The technology disclosed in the present document will allow a flexible use of tile partition as a coding or decoding tool and also allow a clear indication for slice heights inside each subpicture.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video bitstream processing, comprising:
    parsing a parameter set of a video bitstream at a picture level for a first field indicating that a slice height is specified with a subpicture partitioning at the picture level;
    parsing, due to determining that the first field indicates that the slice height is specified with the subpicture partitioning, N second fields in the parameter set of the video bitstream, wherein the N second fields indicate heights for rectangular slices in the picture, wherein the heights are indicated in multiple of coding tree unit (CTU) heights, and wherein each rectangular slice comprises one or more CTU rows that belong to a same subpicture, wherein N is a positive integer;
    wherein the N second fields are omitted from the video bitstream in case that the first field indicates that the slice height is specified for the tile partitioning; and
    decoding, based on the first field and the N second fields, the video bitstream to generate a video.

2. The method of claim 1, wherein the first field is a one-bit field.

3. The method of claim 2, wherein the N second fields are positioned immediately following the first field in the video bitstream.

4. The method of claim 1, wherein the decoding the video bitstream comprises decoding multiple subpictures includes in the picture.

5. The method of claim 1, wherein the N second fields are included in the video bitstream based on a value of the first field, wherein the N second fields are included in the video bitstream when the first field is specified for the subpicture partitioning.

6. The method of claim 1, wherein the parameter set is a picture parameter set.

7. A video decoder apparatus comprising a processor configured to perform operations including:
    parsing a parameter set of a video bitstream at a picture level for a first field indicating that a slice height is specified with a subpicture partitioning at the picture level;
    parsing, due to determining that the first field indicates that the slice height is specified with the subpicture partitioning, N second fields in the parameter set of the video bitstream, wherein the N second fields indicate heights for rectangular slices in the picture, wherein the heights are indicated in multiple of coding tree unit (CTU) heights, and wherein each rectangular slice comprises one or more CTU rows that belong to a same subpicture, wherein N is a positive integer;
    wherein the N second fields are omitted from the video bitstream in case that the first field indicates that the slice height is specified for the tile partitioning; and
    decoding, based on the first field and the N second fields, the video bitstream to generate a video.

8. The apparatus of claim 7, wherein the first field is a one-bit field.

9. The apparatus of claim 8, wherein the N second fields are positioned immediately following the first field in the video bitstream.

10. The apparatus of claim 7, wherein the decoding the video bitstream comprises decoding multiple subpictures includes in the picture.

11. The apparatus of claim 7, wherein the N second fields are included in the video bitstream based on a value of the first field, wherein the N second fields are included in the video bitstream when the first field is specified for the subpicture.

12. The apparatus of claim 11, wherein the parameter set is a picture parameter set.

13. A method of video encoding, comprising:
including, in a video bitstream representing a video, a first field indicative of whether a slice height is specified for a subpicture partitioning for encoding a video picture, wherein the video unit comprises a picture that includes one or more subpictures or one or more tiles;
inserting, due to including the first field indicates that the slice height is specified for the subpicture partitioning, N second fields in the video bitstream indicating heights for rectangular slices in the video picture, wherein the N second fields indicate the heights in multiple of coding tree unit (CTU) heights, and wherein each rectangular slice comprises one or more CTU rows that belong to a same subpicture, wherein N is a positive integer;
wherein the N second fields are omitted from the video bitstream in case that the first field indicates that the slice height is specified for the tile partitioning; and
encoding, by including on the first field and the N second fields, the video picture of the video.

14. The method of claim 13, wherein the first field is a one-bit field.

15. The method of claim 14, wherein the N second fields are included in the video bitstream immediately following the first field.

16. The method of claim 13, wherein the first field and the second field are included in a picture parameter set.

17. A video encoding apparatus comprising a processor configured to perform operations, comprising:
including, in a video bitstream representing a video, a first field indicative of whether a slice height is specified for a subpicture partitioning for encoding a video picture, wherein the video unit comprises a picture that includes one or more subpictures or one or more tiles;
inserting, due to including the first field indicates that the slice height is specified for the subpicture partitioning, N second fields in the video bitstream indicating heights for rectangular slices in the video picture, wherein the N second fields indicate the heights in multiple of coding tree unit (CTU) heights, and wherein each rectangular slice comprises one or more CTU rows that belong to a same subpicture, wherein N is a positive integer;
wherein the N second fields are omitted from the video bitstream in case that the first field indicates that the slice height is specified for the tile partitioning; and
encoding, by including on the first field and the N second fields, the video picture of the video.

18. The video encoding apparatus of claim 17, wherein the first field is a one-bit field.

19. The video encoding apparatus of claim 18, wherein the N second fields are included in the video bitstream immediately following the first field.

20. The video encoding apparatus of claim 17, wherein the first field and the second field are included in a picture parameter set.

* * * * *